(12) United States Patent
Al-Buraik

(10) Patent No.: US 9,341,050 B2
(45) Date of Patent: May 17, 2016

(54) UTILIZATION OF MICROWAVE TECHNOLOGY IN ENHANCED OIL RECOVERY PROCESS FOR DEEP AND SHALLOW APPLICATIONS

(71) Applicant: Saudi Arabian Oil Company, Dhahran (SA)

(72) Inventor: Khaled Abdullah Al-Buraik, Ras Tanura (SA)

(73) Assignee: Saudi Arabian Oil Company (SA)

( * ) Notice: Subject to any disclaimer, the term of this patent is extended or adjusted under 35 U.S.C. 154(b) by 311 days.

(21) Appl. No.: 13/950,852

(22) Filed: Jul. 25, 2013

(65) Prior Publication Data

US 2014/0027109 A1    Jan. 30, 2014

Related U.S. Application Data

(60) Provisional application No. 61/675,422, filed on Jul. 25, 2012.

(51) Int. Cl.
E21B 43/24        (2006.01)
C09K 8/58         (2006.01)
(Continued)

(52) U.S. Cl.
CPC . *E21B 43/24* (2013.01); *C09K 8/58* (2013.01); *C09K 8/592* (2013.01); *E21B 43/16* (2013.01); *E21B 43/2401* (2013.01); *E21B 43/305* (2013.01)

(58) Field of Classification Search
CPC ....................................................... E21B 43/24
USPC ........................................................ 166/248
See application file for complete search history.

(56) References Cited

U.S. PATENT DOCUMENTS

| 3,133,592 A | 5/1964 | Tomberlin |
| 3,170,517 A | 2/1965 | Haagensen |

(Continued)

FOREIGN PATENT DOCUMENTS

| WO | 0057021 A1 | 9/2000 |
| WO | 2007147053 A2 | 12/2007 |

(Continued)

OTHER PUBLICATIONS

International Search Report dated Sep. 29, 2010; International Application No. PCT/US2010/027382.
(Continued)

*Primary Examiner* — David Andrews
*Assistant Examiner* — Ronald Runyan
(74) *Attorney, Agent, or Firm* — Bracewell LLP; Constance Gall Rhebergen; Linda L. Morgan

(57) ABSTRACT

A method and system for treating a portion of a hydrocarbon-bearing formation of a crude oil reservoir containing heavy hydrocarbons using a microwave enhanced heavy hydrocarbon recovery system includes forming a horizontal injection well having an injection horizontal run, forming a horizontal microwave source well having a microwave source horizontal run, forming a horizontal production well having a production horizontal run, introducing a treatment fluid into the crude oil reservoir through the horizontal injection well, introducing a microwave antenna having a microwave emitter into the horizontal microwave source well, introducing electrical power to the microwave emitter such, forming a microwave energy field which reduces the viscosity of the heavy hydrocarbons and forms a production fluid forms, and extracting the production fluid through the horizontal production well. The injection horizontal run is positioned below both the microwave source horizontal run and the production horizontal run.

17 Claims, 1 Drawing Sheet

(51) Int. Cl.
    *C09K 8/592* (2006.01)
    *E21B 43/16* (2006.01)
    *E21B 43/30* (2006.01)

(56) References Cited

U.S. PATENT DOCUMENTS

| | | | |
|---|---|---|---|
| 4,193,448 A | | 3/1980 | Jeambey |
| RE30,738 E | | 9/1981 | Bridges et al. |
| 4,482,634 A | | 11/1984 | Davis, Jr. et al. |
| 4,638,863 A | | 1/1987 | Wilson |
| 5,015,151 A | * | 5/1991 | Snyder, Jr. ............ E21B 43/128 417/18 |
| 5,065,819 A | * | 11/1991 | Kasevich ................ E21B 36/04 166/248 |
| 5,082,054 A | | 1/1992 | Kiamanesh |
| 5,109,927 A | | 5/1992 | Supernaw et al. |
| 5,318,124 A | | 6/1994 | Ong et al. |
| 5,621,844 A | | 4/1997 | Bridges |
| 5,751,895 A | | 5/1998 | Bridges |
| 5,784,530 A | | 7/1998 | Bridges |
| 6,012,520 A | | 1/2000 | Yu et al. |
| 6,189,611 B1 | * | 2/2001 | Kasevich ................ E21B 36/04 166/248 |
| 6,318,464 B1 | * | 11/2001 | Mokrys ................ E21B 43/168 166/252.1 |
| 6,499,536 B1 | | 12/2002 | Ellingsen |
| 7,147,057 B2 | | 12/2006 | Steele et al. |
| 7,367,399 B2 | | 5/2008 | Steele et al. |
| 7,398,823 B2 | | 7/2008 | Montgomery et al. |
| 7,441,597 B2 | | 10/2008 | Kasevich |
| 7,461,693 B2 | | 12/2008 | Considine et al. |
| 7,562,708 B2 | | 7/2009 | Cogliandro et al. |
| 7,677,673 B2 | | 3/2010 | Tranquilla et al. |
| 7,975,763 B2 | | 7/2011 | Banerjee et al. |
| 2006/0283598 A1 | | 12/2006 | Kasevich |
| 2007/0131591 A1 | | 6/2007 | Pringle |
| 2007/0289736 A1 | * | 12/2007 | Kearl ................ E21B 43/2401 166/248 |
| 2008/0073079 A1 | | 3/2008 | Tranquilla et al. |
| 2008/0264934 A1 | | 10/2008 | Moreira et al. |
| 2010/0276148 A1 | | 11/2010 | Wylie et al. |
| 2011/0146982 A1 | | 6/2011 | Kaminsky et al. |
| 2011/0259585 A1 | | 10/2011 | Banerjee et al. |
| 2012/0012319 A1 | | 1/2012 | Dennis |
| 2012/0085533 A1 | | 4/2012 | Madison |

FOREIGN PATENT DOCUMENTS

| | | |
|---|---|---|
| WO | 2009064501 A1 | 5/2009 |
| WO | 2009/094285 A1 | 7/2009 |
| WO | 2010/107726 A2 | 9/2010 |

OTHER PUBLICATIONS

PCT International Search Report and the Written Opinion of the International Searching Authority dated Oct. 23, 2013; International Application No. PCT/US2013/051920; International File Date: Jul. 25, 2013.

* cited by examiner

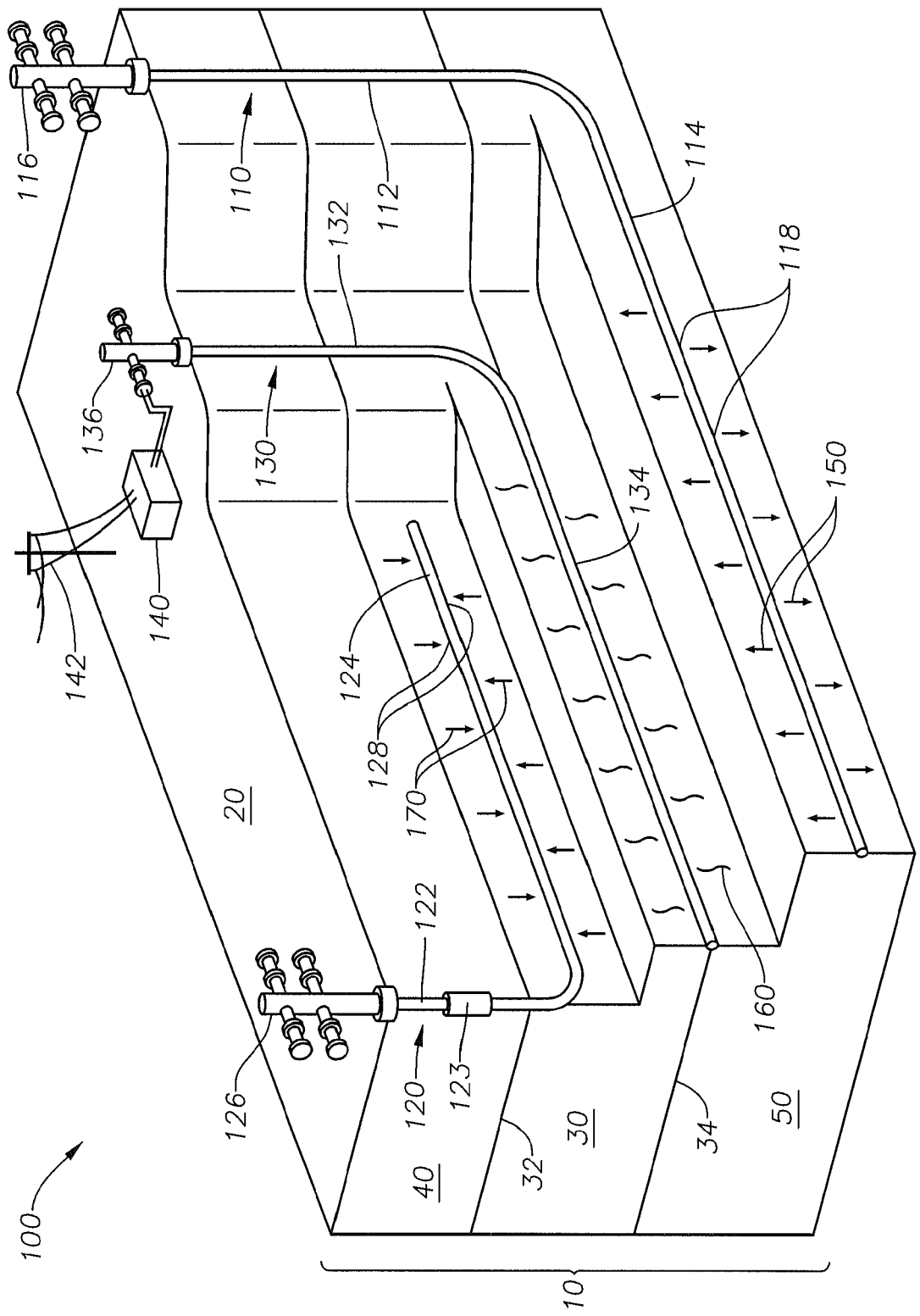

UTILIZATION OF MICROWAVE TECHNOLOGY IN ENHANCED OIL RECOVERY PROCESS FOR DEEP AND SHALLOW APPLICATIONS

CROSS-REFERENCE TO RELATED PATENT APPLICATIONS

This application claims priority from U.S. Provisional Application No. 61/675,422, filed Jul. 25, 2012. For purposes of United States patent practice, this application incorporates the contents of the Provisional application by reference in its entirety.

BACKGROUND OF THE INVENTION

1. Field of the Invention

The field of invention relates to the production of subsurface crude oil deposits. More specifically, the field relates to systems and processes that utilize electromagnetic (EM) radiation and enhance oil recovery (EOR) for the modification and production of subsurface crude oil deposits.

2. Description of the Related Art

A significant percentage of remaining recoverable crude oil resources are in the form of heavy oils, shale, sands and tars. The worldwide average recovery factor, which is a measure of the total amount of crude oil estimated in a reservoir (the original oil in place or "OOIP") versus the amount recovered after primary and secondary recovery, is in a range of from about 30% to about 50%. Much of the remaining crude oil is in the form of heavy petroleum.

Traditional primary and secondary production techniques are not capable of recovering every drop of crude oil from oil-bearing reservoirs. Heavy hydrocarbons have an API value in a range of from about 10° to about 20° and a viscosity that is less than about 10,000 centiPoise (cP). Extra heavy hydrocarbons have an API value of less than about 10°.

There are various technologies available to extract viscous, heavy oils. Cold (that is, ambient temperature) recovery methods include conventional production, water flooding, cold heavy oil production with sand (CHOPS), solvent injection, water alternating gas (WAG) injection, inert gas injection and pressure pulsing. Thermal production methods include steam flooding, cyclic steam stimulation (CSS), steam assisted gravity drainage (SAGD) and underground combustion.

The most widely used method of thermal recovery is steam injection. Steam injection is operable to recover portions of crude oil; however, its applicability is limited. Deep reservoirs with thin oil-bearing zones, elevated pressure reservoirs, and heterogeneous reservoirs are difficult to apply steam injection with success.

The previously mentioned methods often require significant amounts of desalinated or fresh water supplies for maintaining water pressure as well as generating steam, washing and other steps. Management and disposal of the resultant wastewater presents challenges and escalates the cost of each recovered barrel of crude oil. In addition, recovering heavy oil requires a substantial amount of energy for removing the oil from the ground, processing it and transporting it off-site.

SUMMARY OF THE INVENTION

A method for treating a portion of a hydrocarbon-bearing formation of a crude oil reservoir containing heavy hydrocarbons using a microwave enhanced heavy hydrocarbon recovery system includes forming a horizontal injection well. The horizontal injection well is defined by a horizontal injection well bore wall that extends from a surface into the crude oil reservoir. The injection well is operable to permit fluid communication between the surface and the crude oil reservoir. It is also operable to permit the introduction of a treatment fluid into the crude oil reservoir. A portion of the horizontal injection well is an injection horizontal run that has a casing along the horizontal injection well bore wall. The casing along the horizontal injection well bore wall is operable to permit fluid communication between the horizontal injection well and the crude oil reservoir. The method also includes forming a horizontal microwave source well. The horizontal microwave source well is defined by a horizontal source well bore wall that extends from the surface into the hydrocarbon-bearing formation. The source well is operable to permit communication between the surface and the hydrocarbon-bearing formation. It is also operable to permit the introduction of microwave energy into the crude oil reservoir. A portion of the horizontal microwave source well is a microwave source horizontal run that has a casing along the horizontal source well bore wall. The casing along the horizontal source well bore wall is operable to permit energy communication between the horizontal microwave source well and the crude oil reservoir. The method also includes forming a horizontal production well. The horizontal production well is defined by a horizontal production well bore wall that extends from the surface into the hydrocarbon-bearing formation. The production well is operable to permit fluid communication between the surface and the hydrocarbon-bearing formation. It is also operable to permit the extraction of a production fluid from the hydrocarbon-bearing formation. A portion of the horizontal production well is a production horizontal run that has a casing along the horizontal production well bore wall. The casing along the horizontal production well bore wall is operable to permit fluid communication between the horizontal production well and the hydrocarbon-bearing formation. The injection horizontal run is positioned below both the microwave source horizontal run and the production horizontal run. The method also includes introducing a treatment fluid into the crude oil reservoir through the horizontal injection well such that the treatment fluid passes into the portion of the hydrocarbon-bearing formation to be treated. The treatment fluid comprises an aqueous solution with a miscible solvent for the heavy hydrocarbons. The method also includes introducing a microwave antenna having a microwave emitter into the horizontal microwave source well. The microwave antenna is introduced such that the microwave emitter is located in the microwave source horizontal run and such that the microwave emitter is operable to direct microwave energy towards the portion of the hydrocarbon-bearing formation to be treated. The method also includes introducing electrical power to the microwave emitter such that microwave energy is directed towards the portion of the hydrocarbon-bearing formation to be treated. In doing so, a microwave energy field forms that envelopes the portion of the hydrocarbon-bearing formation to be treated. The viscosity of the heavy hydrocarbons located within the microwave energy field is reduced. Also, a production fluid forms within the microwave energy field, where the production fluid comprises the heavy hydrocarbons with reduced viscosity and the treatment fluid. The method also includes extracting the production fluid from the hydrocarbon-bearing formation through the horizontal production well.

A microwave enhanced heavy hydrocarbon recovery system for recovering heavy hydrocarbons from a hydrocarbon-bearing formation of a crude oil reservoir includes a horizontal injection well. The horizontal injection well is defined by a horizontal injection well bore wall that extends from a surface into the crude oil reservoir. The horizontal injection well is operable to permit fluid communication between the surface and the crude oil reservoir. It is also operable to permit introduction of a treatment fluid into the crude oil reservoir. The portion of the horizontal injection well that is an injection horizontal run has a casing along the horizontal injection well bore wall. The casing along the horizontal injection well bore wall is operable to permit fluid communication between the horizontal injection well and the crude oil reservoir. The injection horizontal run is positioned below both the microwave source horizontal run and the production horizontal run. The recovery system also includes a horizontal microwave source well that is defined by a horizontal source well bore wall that extends from the surface into the hydrocarbon-bearing formation. The horizontal microwave source well is operable to permit communication between the surface and the hydrocarbon-bearing formation and to permit the introduction of microwave energy into the crude oil reservoir. A portion of the horizontal microwave source well is a microwave source horizontal run that has a casing along the horizontal source well bore wall. The casing along the horizontal source well bore wall is operable to permit energy communication between the horizontal microwave source well and the crude oil reservoir. The recovery system also includes a horizontal production well that is defined by a horizontal production well bore wall that extends from the surface into the hydrocarbon-bearing formation. The horizontal production well is operable to permit fluid communication between the surface and the hydrocarbon-bearing formation. It is also operable to permit the extraction of a production fluid from the hydrocarbon-bearing formation. A portion of the horizontal production well is a production horizontal run that has a casing along the horizontal production well bore wall. The casing along the horizontal production well bore wall is operable to permit fluid communication between the horizontal production well and the hydrocarbon-bearing formation. The recovery system also includes a microwave energy field system that couples to a source of electrical power. The microwave energy field system has a microwave antenna with a microwave emitter. The microwave antenna is operable to convey electrical power to the microwave emitter. The microwave antenna is positioned in the horizontal microwave source well such that the microwave emitter is located in the microwave source horizontal run. The microwave emitter is operable to convert electrical power into microwave energy and to transmit the microwave energy directionally.

Relative horizontal positioning of the solution injection, microwave source and production wells facilitates recovery. The microwave energy field buoys the heavy hydrocarbons and the aqueous solution with miscible solvent in the portion of the treated hydrocarbon-bearing formation. The microwave heating produces thermal, chemical and physical drives along with changes to the properties of the heavy hydrocarbons.

The microwave energy field renders heavy hydrocarbons mobile and recoverable. For example, a relatively minor elevation in heavy hydrocarbons temperature—100° F. to 200° F.—has a dramatic impact (a reduction in orders of magnitude) on viscosity (and therefore intra-formation mobility) of the heavy hydrocarbon.

BRIEF DESCRIPTION OF THE DRAWINGS

These and other features, aspects, and advantages of the present invention are better understood with regard to the following Detailed Description of the Preferred Embodiments, appended Claims, and accompanying Figures, where:

FIG. 1 is a general schematic of an embodiment of the microwave heavy oil recovery system.

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur.

Spatial terms describe the relative position of an object or a group of objects relative to another object or group of objects. The spatial relationships apply along vertical and horizontal axes. Orientation and relational words including "above" and "below"; "up" and "down" and other like terms are for descriptive convenience and are not limiting unless otherwise indicated.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

The "inclination angle" of a well bore is the measure of deviation in angle from true vertical from the perspective of traversing downward through the well bore from the surface.

An angle of 0° degree downward is "true vertical". An angle of 90° from true vertical is "true horizontal". A "horizontal run", "leg", or "section" is a portion of the well bore where the inclination angle of the well bore is equal to or greater than 65° from true vertical, including values greater than true horizontal up to 115° from true vertical. A "horizontal well" is a well that has a well bore with a horizontal run for a portion of the well bore length. Horizontal wells have other portions of the well bore that are less than 65° in angle, including the vertical run that connects the well bore with the surface through the surface entry point.

The "well bore length" is the length of the fluid flow pathway, representing the long dimension of the well bore versus its diameter or width, internal to the well bore from the surface entry point to the face of the well bore. An "extended reach well" (ERW) is defined as a horizontal well having a well bore length along the horizontal run at least twice as long as the true vertical depth (TVD) of the well bore.

A "multilateral" well is a well bore with branches from a single fluid pathway to the surface in the hydrocarbon-bearing formation. A multilateral well is capable of producing hydrocarbon fluids through at least two different flow pathways simultaneously. A horizontal well drilled through a single hydrocarbon-bearing zone (or "payzone") along a horizontal plane that has several fluid flow paths that fan out from a centralized vertical run is an example of a multilateral well. A multi-tier well is a well bore with well branches or runs at different vertical depths, including a well having a first horizontal run along a first hydrocarbon-bearing strata at a first depth and a second horizontal run along a second hydrocarbon-bearing strata at a second depth different vertical depth. Multilateral and multi-tiered well bores technically have a well bore length along each variation of fluid flow pathway between each well bore face and the surface entry point; however, the well bore length usually defines the longest fluid flow pathway or the pathway of lengthening activity, including drilling.

FIG. 1

FIG. 1 is a general schematic of an embodiment of the microwave enhanced heavy hydrocarbon recovery system. FIG. 1 and its description facilitate a better understanding of the microwave enhanced heavy hydrocarbon recovery system and its method of use. In no way should FIG. 1 limit or define the scope of the invention. FIG. 1 is a simple diagram for ease of description.

FIG. 1 shows microwave enhanced heavy hydrocarbon recovery system 100 as part of a system for extracting heavy hydrocarbons from crude oil reservoir 10 underneath surface 20. Crude oil reservoir 10 includes hydrocarbon-bearing formation 30 between overburden stratum 40 and underburden stratum 50. Hydrocarbon-bearing formation 30 is in physical contact with overburden stratum along upper bound 32 and with underburden stratum along lower bound 34. Hydrocarbon-bearing formation 30 made of a porous rock that contains heavy hydrocarbons and formation water, which is water trapped with the heavy hydrocarbons.

Hydrocarbon-bearing formation 30 is adjacent to and underneath overburden stratum 40. FIG. 1 shows hydrocarbon-bearing formation 30 and overburden stratum 40 in substantially horizontal alignment with one another, although in natural conditions portions of the reservoir including the formation may be at various angles to true horizontal. Liquids and gases from hydrocarbon-bearing formation 30 do not penetrate overburden stratum 40; therefore, hydrocarbon-bearing formation 30 and overburden stratum 40 are not in fluid communication with one another. Surface 20 is the upward bound of overburden stratum 40.

FIG. 1 also shows hydrocarbon-bearing formation 30 adjacent to, in communication with and above underburden stratum 50. Hydrocarbon-bearing formation 30 and underburden stratum 50 are also in substantially horizontal alignment with one another, although this may vary in nature as previously described. Underburden stratum 50 is made of porous rock saturated with water. Hydrocarbon-bearing formation 30 and underburden stratum 50 are in fluid communication with one another.

Microwave enhanced heavy hydrocarbon recovery system 100 includes horizontal solution injection well 110. Horizontal solution injection well 110 extends from surface 20 vertically downward as injection vertical run 112 and into underburden stratum 50. In underburden stratum 50, horizontal solution injection well 110 turns, forming injection horizontal run 114. Injection horizontal run 114 is co-planer with and penetrates underburden stratum 50. Injection port 116 caps horizontal solution injection well 110 at surface 20. Along injection horizontal run 114 are several solution distribution ports 118 for fluidly communicating with underburden stratum 50. Horizontal solution injection well 10 is in fluid communication with a source for treatment fluid (not shown) on surface 20 through injection port 116.

Microwave enhanced heavy hydrocarbon recovery system 100 includes horizontal production well 120. Horizontal production well 120 extends from surface 20 vertically downward as production vertical run 122 and into hydrocarbon-bearing formation 30. Production vertical run 122 has ESP 123 that is in-line and operable for providing artificial lift. In hydrocarbon-bearing formation 30, horizontal production well 120 turns, forming production horizontal run 124. Production horizontal run 124 is co-planer with and penetrates hydrocarbon-bearing formation 30 proximate to overburden stratum 40. Production port 126 caps horizontal production well 120 at surface 20. Along production horizontal run 124 are several production fluid recovery ports 128 fluidly connecting with the hydrocarbon-bearing formation 30 and operable to receive the production fluid.

Microwave enhanced heavy hydrocarbon recovery system 100 includes horizontal microwave source well 130. Horizontal microwave source well 130 extends from surface 20 vertically downward as source vertical run 132 and into a position between hydrocarbon-bearing formation 30 and underburden stratum 50 along lower bound 34. At lower bound 34, horizontal microwave source well 130 turns and forms microwave source horizontal run 134. FIG. 1 shows microwave source horizontal run 134 co-planar with and running along lower bound 34 such that microwave source horizontal run 134 is underneath hydrocarbon-bearing formation 30. Source port 136 caps horizontal microwave source well 130 at surface 20. Microwave source horizontal run 134 permits transmission of microwave energy into both or either hydrocarbon-bearing formation 30 or underburden stratum 50. Microwave source horizontal run 134 is also operable to protect the microwave transmission means from damage by fluids contained in and traversing through hydrocarbon-bearing formation 30 and underburden stratum 50.

Microwave enhanced heavy hydrocarbon recovery system 100 includes the microwave antenna with several microwave emitters (not shown). Horizontal microwave source well 130 contains the microwave antenna with microwave emitters. The microwave emitters are spaced along a portion of the length of the microwave antenna. The microwave antenna is in a position in microwave source horizontal run 134 such that the microwave emitters are operable to transmit microwave energy from microwave source horizontal run 134 and into either or both hydrocarbon-bearing formation 30 or underburden stratum 50 upon electrical inducement. The microwave antenna is in electrical communication with microwave generator 140, which is operable to provide the electrical inducement for the microwave emitters, through an electrical connection at source port 136. Microwave generator 140 connects to power transmission line 142, which acts as a source of electrical power.

FIG. 1 shows injection horizontal run 114, production horizontal run 124, and microwave source horizontal run 134 in directional alignment but not necessarily horizontally or vertically co-planar. The horizontal plane occupied by production horizontal run 124 is closer to surface 20 (or "higher" or "above") than the horizontal plane occupied by microwave source horizontal run 134. In turn, the horizontal plane of microwave source horizontal run 134, which in turn is closer to surface 20 (or "higher" or "above") than the horizontal plane occupied by injection horizontal run 114.

The method for using microwave enhanced heavy hydrocarbon recovery system 100 to recover heavy oil from crude oil reservoir 10 includes introducing (arrows 150) the treatment fluid into underburden stratum 50 through several solution distribution ports 118 of horizontal solution injection well 110. The introduction of the treatment fluid into water-saturated underburden stratum 50 puts pressure on the incompressible fluids present in underburden stratum 50. The introduction pressure and the composition of the treatment fluid motivates both formation water present in the underburden stratum 50 and the treatment fluid to flow generally upward from horizontal solution injection well 110 towards horizontal production well 120 through underburden stratum 50 and hydrocarbon-bearing formation 30. The buoyancy of some of the constituents of the treatment fluid also induces upwards movement towards horizontal production well 120. Treatment fluid is introduced into horizontal solution injection well 110 through injection port 116 at surface 20.

The method also includes the step of introducing the microwave antenna with several microwave emitters into horizontal microwave source well 130 such that the microwave emitters are in microwave source horizontal run 134.

The method also includes the step of transmitting (waves 160) microwave energy into hydrocarbon-bearing formation 30 and underburden stratum 50 such that a microwave energy field forms around the portion of microwave source horizontal run 134 where the microwave emitters are located and transmitting. Transmission of microwave energy into hydrocarbon-bearing formation 30 causes a reduction in the viscosity of the heavy hydrocarbons located in the microwave energy field, the creation of lighter hydrocarbons from a portion of the heavier hydrocarbons, the energization of treatment fluid components susceptible to energization that are present, the formation of the production fluid, and the flow of the production fluid towards production horizontal run 124.

The method includes extracting (arrows 170) production fluid from hydrocarbon-bearing formation 30 through several production fluid recovery ports 128. An embodiment of the method includes extracting the production fluid from horizontal production well 120 by operating ESP 123. The production fluid passes from crude oil reservoir 10 to a receiver of the production fluid (not shown) on surface 20, including storage, transportation and separations systems, in fluid communication through production port 126.

As the microwave-formed production fluid flows towards horizontal production well 120, a combination of treatment fluid and formation water displaces the void in hydrocarbon-bearing formation 30 where the microwave energy field is present. The microwave energy field energizes the treatment fluid components susceptible to energization, including the aqueous solution of the treatment fluid. An embodiment of the method includes the creation of a supercritical fluid from the energization of the treatment fluid in the microwave energy field. The energized components in the production fluid assist the flow towards production horizontal run 124 while the microwave energy field is active.

Horizontal Wells

The microwave enhanced heavy oil recovery system includes at least three different types of horizontal wells: the injection well, the microwave source well, and the production well.

The configuration of each horizontal well permits the conveyance of fluids and materials and between the interior of the crude oil reservoir and the surface. The well bore wall defines the boundary of each horizontal well along the length of the well bore. The fluid flow pathway that each horizontal well forms extends from the surface entry point (proximal end) to the rock face (distal end) of the horizontal well. Each horizontal well has a horizontal run or leg along its well bore length.

The horizontal wells of the microwave enhanced heavy oil recovery system can have single, multilateral or multi-tier horizontal run configurations. The horizontal well configurations include extended reach wells.

The horizontal injection wells have a horizontal run in the crude oil reservoir. The horizontal injection well has casing or liner made of a material positioned along the horizontal run to support the well bore wall and to provide fluid access to the crude oil reservoir. The casing or liner can be perforated before or after installation to permit fluid communication with the hydrocarbon-bearing formation. The horizontal injection well is also in fluid communication with the horizontal production well through the crude oil reservoir.

An embodiment of the microwave enhanced heavy hydrocarbon recovery system includes where the injection horizontal run of the horizontal injection well is located within the hydrocarbon-bearing formation. An embodiment of the system includes where the crude oil reservoir has an underburden stratum, where the underburden stratum is in fluid communication with and positioned below the hydrocarbon-bearing formation, and where the injection horizontal run is located within the underburden stratum.

The horizontal production well has a horizontal run in the hydrocarbon-bearing formation. The horizontal production well has casing or liner made of material positioned along the horizontal run to support the well bore wall and to provide fluid access to the hydrocarbon-bearing formation. The casing or liner can be perforated before or after installation to promote for fluid communication between the hydrocarbon-bearing formation and the horizontal injection well.

An embodiment of the microwave enhanced heavy oil recovery system includes a horizontal production well with a horizontal run in the hydrocarbon-bearing formation proximate to and in alignment with the overburden adjacent to the hydrocarbon-bearing formation.

The horizontal microwave source well has a microwave source horizontal run in the hydrocarbon-bearing formation. The horizontal microwave source well is operable to permit the introduction and positioning of the microwave antenna having microwave emitters. While transmitting microwave energy into the hydrocarbon-bearing formation, the microwave emitters are in the microwave source horizontal run portion of the horizontal microwave source well.

The microwave enhanced heavy oil recovery system includes a microwave source horizontal run with a casing or production liner that is operable to protect the microwave antenna from the fluids (for example, steam, treatment fluid, formation water) in the hydrocarbon-bearing formation while permitting microwave transmission into the hydrocarbon-bearing formation. Lining especially suitable for use in the microwave source horizontal run, including liners and casing made of non-perforated polymer. The polymer material should not degrade due to energization from the transmitted microwaves or from exposure to elevated temperatures. An embodiment of the system includes where the material of construction of the microwave source horizontal run casing is a non-perforated polymer. Examples of suitable lining materials include PVC and HDPE. An embodiment of the system includes where the non-perforated polymer is a polyvinyl chloride or a high-density polyethylene.

The relative position of the horizontal segments of the horizontal wells supports the introduction of treatment fluid, the creation of production fluid and the capture of heavy hydrocarbon-bearing production fluid by the production well through the microwave enhanced heavy oil recovery method. An embodiment of the system includes where the microwave source horizontal run is positioned below the production horizontal run.

In the microwave enhanced heavy oil recovery system, the position of the injection horizontal run introducing treatment fluid into the crude oil reservoir is below both the production horizontal run recovering the production fluid from and the microwave source horizontal run transmitting microwave energy into the hydrocarbon-bearing formation, respectively. The embodiment of the microwave enhanced heavy oil recovery system shown in FIG. 1 shows such spatial relationship between three horizontal wells. The injection horizontal run introducing treatment fluid during the microwave enhanced heavy oil recovery method is not required to be in any sort of direct vertical alignment with the microwave source horizontal run transmitting microwave energy or the production horizontal run recovering production fluid, although an embodiment of the microwave enhanced heavy oil recovery system includes such an orientation. Rather, the position of the injection horizontal run during introduction of the treatment fluid is along a deeper horizontal plane into the crude oil reservoir as compared to the other two other types of horizontal well segments.

In the microwave enhanced heavy oil recovery system, the position of the microwave source horizontal run transmitting microwave energy into the hydrocarbon-bearing formation is along a horizontal plane that is the same depth or below the horizontal plane of the production horizontal run. The embodiment of the microwave enhanced heavy oil recovery system shown in FIG. 1 is an example of such spatial relationship between the source and the production horizontal wells. As with the prior discussion regarding vertical alignment and the injection horizontal run, there is no requirement for either vertical or horizontal alignment between the horizontal well segments, although an embodiment of the microwave enhanced heavy oil recovery system includes such a configuration.

An embodiment of the system includes where at least two of the group consisting of the injection horizontal run, the microwave source horizontal run, and the production horizontal run are in directional alignment with one another. An embodiment of the system includes where at least two of the group consisting of the injection horizontal run, the microwave source horizontal run, and the production horizontal run are in both directional alignment and vertical alignment with one another. Vertical and directional horizontal run alignment of the three well types, which is suggested but is not shown in FIG. 1, is efficient in the recovery of production fluid along an application length of the hydrocarbon-bearing formation.

Treatment fluid, which is an aqueous solution with miscible solvent, pushes into the crude oil reservoir along the application length of the injection horizontal run. Upon contact with the microwave energy field produced by a co-directional and vertically aligned source horizontal well above the injection horizontal well along an applicable length, water in the aqueous solution converts to steam and the miscible solvent energizes. Buoyed by the energy imparted through the transmitted microwave energy, the steam and energized miscible solvent extract heavy hydrocarbon from the hydrocarbon-bearing formation in the microwave energy field, forming the production fluid. The production fluid moves in a vertical direction, driven by steam and elevated temperatures, towards the co-directional and vertically aligned production horizontal well. The production horizontal run recovers the production fluid along its applicable length and transports it out of the crude oil reservoir.

Although the embodiment of the microwave enhanced heavy oil recovery system of FIG. 1 shows the horizontal runs of the horizontal injection well, the horizontal microwave source well and the horizontal production well in two-dimensional (2-D) directional alignment, directional or planar alignment of a horizontal section of a first horizontal well type with a horizontal section of a second horizontal well type is not required. An embodiment of the microwave enhanced heavy oil recovery system has horizontal sections that are directionally skewed relative to one another. In multilateral and multi-tier horizontal wells, it is expected that various horizontal runs for the three types of wells are in some portions in alignment with and in other portions skewed relative to one another.

An embodiment of the system includes where the microwave source horizontal run and the production horizontal run are located proximate to one another in the hydrocarbon-bearing formation such that a microwave energy field at least partially envelopes the production horizontal run. An embodiment of the system includes where the microwave source horizontal run and the injection horizontal run are located proximate to one another in the crude oil reservoir such that a microwave energy field at least partially envelopes the injection horizontal run.

Treatment Fluid

The treatment fluid is an aqueous solution with a miscible solvent for the heavy hydrocarbons. An embodiment of the treatment fluid includes a single-phase solution where the miscible solvent dissolves to saturation in the aqueous solution. An embodiment of the treatment fluid includes a dual-phase material of both a liquid and a gas, including a gas-entrained liquid. The treatment fluid includes a supercritical fluid and a liquid. The introduction of treatment fluid to the hydrocarbon-bearing formation conveys the miscible solvent to the heavy hydrocarbon. The miscible solvent diffuses into the heavy hydrocarbon and mobilizes the heavy hydrocarbon for extraction. The aqueous solution sweeps mobilized heavy hydrocarbons along towards extraction.

The aqueous solution used as the base for the treatment fluid includes water, which can take the form of deionized, tap and fresh waters; unsaturated, brackish, natural, saturated and super-saturated salt waters; natural, salt dome, petroleum production byproduct and synthetic brines; seawater; mineral waters; and other potable and non-potable waters containing one or more dissolved salts, minerals or organics. Water that lacks mineral and organic content maximizes the saturation or entrainment level of the miscible solvent and prevents mineral or salt build-up in injection systems. The economics of long-term extraction operations, however, usually favors the reinjection of production byproduct brines and "formation water", which is a brackish or briny material co-produced with the heavy hydrocarbons and separates upon reaching the surface.

Useful miscible solvents for the heavy hydrocarbons include purified fractions and mixtures of hydrocarbon gases, including methane, ethane, propane, n-butane, natural gas and liquefied petroleum gases (LPG), which is usually made of a combination of propane and butanes. Useful miscible solvents also include purified fractions and mixtures of inorganic gases, including carbon dioxide, carbon monoxide, air, nitrogen and oxygen. The miscible solvent can include mixtures of hydrocarbon gas and inorganic gas. The method of treatment of includes introducing a miscible solvent of the heavy hydrocarbons that is selected from the group consisting of air, nitrogen, oxygen, carbon monoxide, carbon dioxide, methane, ethane, propane, normal butane, liquidified petroleum gas (LPG) and combinations thereof.

A miscible solvent for use in heavy hydrocarbon recovery has a concentration of at least 95 mole percent, or greater than 98 mole percent, or greater than 99 mole percent or greater than 99.5 mole percent.

Without intending to be bound by theory, the miscible solvent interacts with the heavy hydrocarbons trapped in the crevices and pores in the hydrocarbon-bearing formation. The miscible solvent interacts with the heavy hydrocarbon such that the heavy hydrocarbon viscosity drops such that it is more mobile, the interfacial tension of the heavy hydrocarbon approaches zero such that it flows more easily, and the volume of the heavy hydrocarbon increases such that it pushes itself out of the crevices and pours containing it. The combination of changes renders previously non-recoverable heavy hydrocarbons recoverable using standard non-primary recovery techniques, including water and gas sweeping. The miscible solvent also lowers the localized hydrocarbon vapor pressure, which causes lighter hydrocarbons with the heavy hydrocarbons to move into the vapor phase. The miscible solvent not entering the pores and crevices of the formation or dissolving into the heavy hydrocarbons acts in concert with other treatment fluid constituents to sweep the mobilized heavy hydrocarbons towards the horizontal production well.

The level of miscibility of the miscible solvent with the heavy hydrocarbon in the hydrocarbon-bearing formation is a function of the environmental conditions, including temperature and pressure.

A miscible solvent at a temperature at or above its critical temperature and at a pressure at or above its critical pressure is in a supercritical fluid state. At the critical point, the physical properties of the liquid and gaseous states of the miscible solvent are indistinguishable. In the presence of another diluent, the two materials can blend and form a homogenous mixture. Table 1 shows critical temperature and pressure points for several useful miscible solvents. "Cm³/gmol" is centimeters per gram mole.

TABLE 1

Critical temperature and pressure values for several useful miscible solvents.

| Miscible Solvent | Temperature (° C.) | Pressure (bar) | Specific Molar Volume (cm³/gmole) |
|---|---|---|---|
| Air | −140.74 | 37.74 | 92.35 |
| N-Butane | 152.02 | 37.97 | 255 |
| Carbon Dioxide | 31.05 | 73.87 | 94 |
| Carbon Monoxide | −140.24 | 34.99 | 93 |
| Methane | −82.45 | 46.41 | 99 |

TABLE 1-continued

Critical temperature and pressure values for several useful miscible solvents.

| Miscible Solvent | Temperature (° C.) | Pressure (bar) | Specific Molar Volume (cm³/gmole) |
|---|---|---|---|
| Nitrogen | −146.95 | 33.98 | 90 |
| Oxygen | −118.37 | 50.80 | 74 |
| Propane | 96.86 | 42.66 | 200 |
| Water | 374.12 | 221.06 | 56 |

Production Fluid

The production fluid forms inside the microwave energy field in the hydrocarbon-bearing formation. The production fluid is a combination of heavy hydrocarbons with reduced viscosity due to the presence of the active microwave energy field; lighter hydrocarbons, which can form as the result of chemical conversions, thermal or catalytic cracking with the reservoir or the production run; water; and miscible solvent. The water is in the production fluid can be in liquid, vaporous or dual-phase state. The miscible solvent in the production fluid is in a vaporous, liquid or supercritical state.

Microwave System

The microwave system includes the microwave antenna, which has microwave emitters for transmitting microwave energy, the microwave generator, and a power source.

The microwave antenna couples to the microwave generator. The microwave generator is operable to transmit energy through the microwave antenna. The microwave generator provides energy such that the microwave emitters can transmit microwave energy into the hydrocarbon-bearing formation, forming a microwave energy field.

A variety of electrical power sources can provide electrical power to the microwave generator. Along with traditional electricity transmission and generation systems, alternative energy supply systems, including solar panels with reserve capacitors or batteries, can ensure continuous and steady application of power to the microwave antenna during a 24-hour cycle. It also permits the system to operate "off the grid" in more remote locations.

The microwave antenna includes microwave emitters spaced along at least a portion of the axial length of the microwave antenna. An embodiment of the system includes where the microwave emitters are spread along the portion of the axial length of the microwave antenna positioned in the microwave source horizontal run. An embodiment of the system includes where microwave emitters, which can include parabolic reflectors, convey the microwave energy towards a specific target or region of the hydrocarbon-bearing formation. In such an embodiment, the microwave emitters can couple to a control system that can direct the position of the emitters while in the horizontal source run. An embodiment of the method of use includes where the microwave emitter directs microwave energy towards the injection horizontal run and where the introduction of electrical power is such that the microwave energy field formed envelopes at least a portion of the injection horizontal run. An embodiment of the method of use includes where the microwave emitter directs microwave energy towards the production horizontal run and where the introduction of electrical power is such that the microwave energy field formed envelopes at least a portion of the production horizontal run.

Introduction of the microwave antenna into the horizontal microwave source well uses standard horizontal tool insertion and positioning techniques known to those of ordinary skill in the industry. The introduction of the microwave antenna can position the microwave emitters in the microwave source horizontal run such that transmission of microwave energy from the microwave emitters forms the microwave energy field that envelopes a portion of the hydrocarbon-bearing formation. An embodiment of the method of use includes where the microwave energy field envelopes a portion of the crude oil reservoir, including the underburden. Having a portion of the underburden, especially a water-rich underburden, enveloped in part by the microwave energy field can create a significant steam drive for the production of the heavy hydrocarbons.

The microwave emitter transmits in a frequency range of from about 300 MHz to about 300 GHz.

Microwaves Energy Field System

Upon microwave energy transmission from the microwave antenna into the crude oil reservoir, the microwave energy field forms. The energy present in the microwave energy field lowers the viscosity of the heavy hydrocarbons within the field through a combination of effects, including direct microwave energy absorption, secondary thermal heating, thermal and catalytic cracking of heavy hydrocarbons into light hydrocarbons and adsorption of energized miscible solvent into the heavy hydrocarbons.

The temperature inside the microwave energy field promotes the reduction of viscosity of the heavy hydrocarbons, assisting them in moving more easily through the hydrocarbon-bearing formation. Although heavy hydrocarbons have a viscosity of less than 10,000 cP, reducing viscosity further promotes easier movement through porous and tight formations alike.

An embodiment of the method of treatment includes where the introduction of electrical power is such that water present in the microwave energy field is converted into steam. Saturated and superheated steam in the presence of minerals and salts can promote thermally and catalytically crack heavy hydrocarbons into lighter and more mobile smaller hydrocarbons.

Regardless of its source as part of the treatment fluid or formation water, the water present in the microwave energy field elevates in temperature from its background or introduced condition. The temperature elevation that occurs in the microwave energy field causes many changes to the water, the miscible solvent introduced with the water, the hydrocarbon-bearing formation and the heavy hydrocarbons.

An in-situ steam cycle forms with continuous microwave transmission: Hot water converts into steam in the crude oil reservoir that condenses back to hot water as the steam conveys thermal energy into the surrounding hydrocarbon-bearing formation. The cycling between steam and liquid (also sometimes called a 'steam drive') creates a hot water flood front and a pressure gradient that pushes heavy hydrocarbons out of the area enveloped by the microwave energy field.

Microwaving water makes it buoyant as steam or hot water, and it rises towards the surface. This buoyancy effect pulls additional water from lower in the reservoir into the microwave energy field, where it is energized and perpetuates the uplifting action.

An embodiment of the method of use includes where the introduction of electrical power is such that light hydrocarbons form from the heavy hydrocarbons with reduced viscosity in the microwave energy field and such that the production fluid also comprises light hydrocarbons. With enough electrical power and under suitable crude oil formation conditions, including the matrix material and the composition of the heavy hydrocarbons, the microwave energy field can promote cracking of the largest of the heavy hydrocarbons into smaller hydrocarbons. The smaller hydrocarbons are part of a light hydrocarbon material that is part of the product fluid. Hydrocarbon cracking is endothermic by nature, and the heat provided by the formation directly heated by the microwaves as well the heated water can foster cracking in the microwave energy field in the hydrocarbon-bearing formation.

At a given temperature, a hydrocarbon with a greater carbon count tends to react before a hydrocarbon with a lesser carbon count. In reference to the relative use of the words "lesser", such as "lesser hydrocarbons" or "lesser aromatics", and its opposing term "greater", "lesser" and "greater" indicates a comparison of the number of carbon-carbon bonds in the reactant and product hydrocarbon molecules before and after cracking. The number of carbon atoms in the reactant and product hydrocarbon compounds is the same (that is, mass is not lost); however, the cracking product has a greater number of hydrocarbon and heteroatom compounds than the reactant.

An embodiment of the method of use includes where the introduction of electrical power is such that stress fracturing occurs in at least a portion of the hydrocarbon-bearing formation enveloped by the microwave energy field. Secondary heating of isolated heavy hydrocarbon and water causes both to at least attempt to expand against their surroundings. Adding energy into trapped fluids that cannot freely expand puts pressure on the formation. In addition, localized areas can produce severe temperature gradients in the formation material. Both temperature gradients and internal pressure can create stress in the hydrocarbon-bearing formation that may cause formation fracturing. Fracturing can release previously-isolated heavy hydrocarbons and formation water. The fracturing can also create new fluid flow pathways for treatment fluid, steam and production fluid.

An embodiment of the method of use includes where the introduction of electrical power is such that the miscible solvent of the heavy hydrocarbon present in the microwave energy field is converted into a supercritical fluid. In addition to water, miscible solvents susceptible to energization in the microwave energy field can also adsorb energy. The energized miscible solvent can become more chemically active upon energization, penetrating deeper into the hydrocarbon-bearing formation and improving recovery of heavy hydrocarbons through chemical modification of the properties of the heavy hydrocarbon. Certain miscible solvents, including air and oxygen, in the high-energy and temperature mineral and salt-environment can form free radicals that chemically convert the heavy hydrocarbon and create smaller, more mobile hydrocarbons. The miscible solvent can change phases, including becoming vaporous or supercritical at the pressure and temperature of the superheated steam, heated water or in the pours of the reservoir. Supercritical carbon dioxide, propane and n-butane, at room temperature conditions not miscible with water, can as supercritical fluids merge with the heated water and chemically modify the properties of the heavy hydrocarbon such that they move out of the pours of the hydrocarbon-bearing formation and are susceptible to bulk transport.

An embodiment of the microwave enhanced heavy oil recovery system includes locating the microwave source horizontal run for transmitting microwave energy proximate to the injection horizontal run for providing treatment fluid. During an embodiment of the method of using such an embodiment of the system, the creation of the microwave energy field extends to a position proximate to the injection horizontal run. In another embodiment, the microwave energy field extends to a position that envelopes at least a portion of the injection horizontal run. The increase in in-situ steam production by creating an active microwave energy field near or within the injection horizontal run can drive energized aqueous solution with miscible solvent from the very lowest part of the hydrocarbon-bearing formation upward towards the horizontal production well, along the way creating the production fluid from the combination and interaction between the treatment fluid and encountered heavy hydrocarbons.

An embodiment of the microwave enhanced heavy oil recovery system includes locating the microwave source horizontal run for transmitting microwave energy into the hydrocarbon-bearing formation proximate to the production horizontal run for recovering production fluid. During an embodiment of the method of using such an embodiment of the system, the creation of the microwave energy field extends to a position proximate to the production horizontal run. In another embodiment, the microwave energy field extends to a position that envelopes at least a portion of the production horizontal run. The creation of the active microwave energy field ensures continuous reduction in viscosity of the heavy hydrocarbons as they move as part of the production fluid through the microwave energy field towards the production horizontal run.

Control System

Optionally, the microwave enhanced heavy oil recovery system can include a control system that couples the injection horizontal run, the microwave source horizontal run, and the production horizontal run together through a series of sensors and electrical signal transmission lines. A control system coupling the several horizontal runs is useful for monitoring the properties of the fluids within the various horizontal runs. An embodiment of the system includes a control system that is operable to monitor temperature conditions within the various horizontal runs. An embodiment of the system includes a control system that is operable to monitor temperature conditions within the production horizontal run.

The control system is useful for maintaining various aspects of the operation of the microwave enhanced heavy oil recovery system, including operation of the microwave system, the rate of introduction of the treatment fluid, the rate of producing the production fluid, and the direction of the emission of the microwave energy. An embodiment of the method of use includes monitoring the temperature within the microwave source horizontal run and adjusting the introduction of electrical power accordingly. Monitoring the microwave source horizontal run temperature can prevent long-term damage to the microwave emitters or the casing material from overheating. An embodiment of the method of use includes monitoring the temperature within the injection horizontal run and adjusting the introduction of electrical power accordingly. Monitoring the injection horizontal run temperature can indicate that the introduction rate of treatment fluid should be changed or that the amount of energy supplied to the microwave emitters should be modified. An embodiment of the method of use includes monitoring the temperature within the production horizontal run and adjusting the introduction of electrical power accordingly. Monitoring the production horizontal run temperature can indicate that the production rate of production fluid should be changed, that the amount of energy supplied to the microwave emitters should be modified, or that the conditions in the production horizontal run are appropriate for the miscible solvent used (that is, the miscible solvent is in not in a supercritical state). An embodiment of the method of use includes monitoring the pressure within the production horizontal run and adjusting the introduction of electrical power accordingly. Monitoring the production horizontal run pressure can indicate whether use of the artificial lift system is necessary to produce the production fluid, that the amount of energy supplied to the microwave emitters should be modified, or that the conditions in the production horizontal run are appropriate for the miscible solvent used (that is, the miscible solvent is in not in a supercritical state). Other sensors or systems known to those of skill in the art can be used to couple the various horizontal runs together to monitor and maintain operations.

The control system can also be useful in controlling aspects of the microwave antenna. An embodiment of the system includes where the control system couples to the microwave antenna and the control system is operable to manipulate the direction of microwave emission from the microwave emitters.

The control system can be a manual feedback system, where a signal representing a detected condition requires a manual intervention to change the detected condition, or automated system, where the detected condition signal is conveyed to an automated control system that responds according to pre-determined instructions. An embodiment the microwave enhanced heavy oil recovery system includes a control system that uses a computer controller having pre-determined instructions (representing a computer program) and that is operable to receive signals regarding the detected condition, to interpret the detected condition based upon pre-determined requirement, and to change the use of the microwave enhanced heavy oil recovery system, including the amount of energy supplied to the microwave system, the rate of introduction of the treatment fluid, and the rate of producing the production fluid, to fulfill the pre-determined requirements. Regulation of the amount of microwave energy transmitted through the microwave emitters can affect the recovery efficiency, the production rate and composition of the production fluid. In conjunction with sensors monitoring process characteristics, including temperature, flow rate, pressure and composition, the computerized control system can increase or decrease the power provided to the microwave antenna thought the microwave generator based upon pre-programmed instructions for desired production fluid characteristics. An embodiment of the microwave enhanced heavy oil recovery system includes the computer controller that couples to the means of providing energy to the microwave emitters, to the means of extracting the production fluid, and to the means of introducing treatment fluid into the microwave enhanced heavy oil recovery system. Such an arrangement would permit 24-hour monitoring and control of the use of the microwave enhanced heavy oil recovery system without requiring either direct or remote human intervention.

Artificial Lift System

Recovery of more production fluid occurs with a decrease of pressure in the production tubing at the bottom of the well bore. An embodiment of the microwave enhanced heavy oil recovery system includes an artificial lift device, including devices such as an electrical submersible pump (ESP) to increase the rate of recovery of production fluid from the crude oil reservoir. An embodiment of the method of use includes introducing an ESP into the horizontal production well such that the ESP is located in a non-horizontal portion of the horizontal production well and operating the ESP such that production fluid is extracted from the hydrocarbon-bearing formation. The production vertical run incorporates the artificial lift device. An example of an artificial lift device is an electrical submersible pump. An ESP can have multiple pumping stages.

Water Recycle System

Optionally, the microwave enhanced heavy oil recovery system can include a water recycle system. An embodiment of the microwave enhanced heavy oil recovery system includes a water recycle system that couples to both the horizontal production well and the horizontal injection well. The water recycle system is operable to receive production fluid from the horizontal production well, to separate the water from the production fluid, and to convey the separated water to the horizontal injection well. In effect, the water recycle system creates a closed water recycle loop as part of the microwave enhanced heavy oil recovery system. Water is introduced into the hydrocarbon-bearing formation as part of the treatment fluid. Water recovered from the production fluid is recycled and injected as the aqueous solution portion of the treatment fluid.

The recovered water from the water recycle system can be converted into treatment fluid useful for introduction into the hydrocarbon-bearing formation through the horizontal injection well. The treatment fluid can be formed by introduction of miscible solvent for the heavy hydrocarbons to the recovered water such that treatment fluid forms.

An embodiment of the microwave enhanced heavy oil recovery system includes a control system that couples with the water recycle system. An embodiment of the method of use includes monitoring and maintaining the operation of the water recycle system such that water is recovered from the production fluid and converted into treatment fluid through the addition of miscible solvent for the heavy hydrocarbons to the recovered water.

Supporting Equipment

Embodiments include many additional standard components or equipment that enables and makes operable the described apparatus, process, method and system. Examples of such standard equipment known to one of ordinary skill in the art includes heat exchanges, pumps, blowers, reboilers, steam generation, condensate handling, membranes, single and multi-stage compressors, separation and fractionation equipment, valves, switches, controllers and pressure-, temperature-, level- and flow-sensing devices.

Operation, control and performance of portions of or entire steps of a process or method can occur through human interaction, pre-programmed computer control and response systems, or combinations thereof.

What is claimed is:

1. A method for treating a portion of a hydrocarbon-bearing formation of a crude oil reservoir containing heavy hydrocarbons using a microwave enhanced heavy hydrocarbon recovery system, the process of heavy hydrocarbon recovery comprising the steps of:

forming a horizontal injection well that is defined by a horizontal injection well bore wall that extends from a surface to below a lower boundary of the crude oil reservoir, that is operable to permit fluid communication between the surface and the crude oil reservoir, and that is operable to permit the introduction of a treatment fluid into the crude oil reservoir, where a portion of the horizontal injection well is an injection horizontal run that has a casing along the horizontal injection well bore wall, and where the casing along the horizontal injection well bore wall is operable to permit fluid communication between the horizontal injection well and the crude oil reservoir;

forming a horizontal microwave source well that is defined by a horizontal source well bore wall that extends from the surface to the lower boundary of the hydrocarbon-bearing formation, that is operable to permit communication between the surface and the hydrocarbon-bearing formation, and that is operable to permit the introduction of microwave energy into the crude oil reservoir, where a portion of the horizontal microwave source well is a microwave source horizontal run that has a casing along the horizontal source well bore wall that extends proximate to the lower boundary, and where the casing along the horizontal source well bore wall is operable to permit energy communication between the horizontal microwave source well and the crude oil reservoir;

forming a horizontal production well that is defined by a horizontal production well bore wall that extends from the surface into the hydrocarbon-bearing formation, that is operable to permit fluid communication between the surface and the hydrocarbon-bearing formation, and that is operable to permit the extraction of a production fluid from the hydrocarbon-bearing formation, where a portion of the horizontal production well is a production horizontal run that has a casing along the horizontal production well bore wall, and where the casing along the horizontal production well bore wall is operable to permit fluid communication between the horizontal production well and the hydrocarbon-bearing formation;

introducing a treatment fluid into the crude oil reservoir through the horizontal injection well such that the treatment fluid passes into the portion of the hydrocarbon-bearing formation to be treated, where the treatment fluid comprises an aqueous solution with a miscible solvent for the heavy hydrocarbons;

introducing a microwave antenna having a microwave emitter into the horizontal microwave source well such that the microwave emitter is located in the microwave source horizontal run and such that the microwave emitter is operable to direct microwave energy towards the portion of the hydrocarbon-bearing formation to be treated, wherein the horizontal microwave source well is a separate from the horizontal injection well and the horizontal production well;

introducing electrical power to the microwave emitter such that microwave energy is directed towards the portion of the hydrocarbon-bearing formation to be treated, such that a microwave energy field forms that envelopes the portion of the hydrocarbon-bearing formation to be treated, such that the viscosity of the heavy hydrocarbons located within the microwave energy field is reduced, and such that the production fluid forms within the microwave energy field, where the production fluid comprises the heavy hydrocarbons with reduced viscosity and the treatment fluid; and extracting the production fluid from the hydrocarbon-bearing formation through the horizontal production well;

where the injection horizontal run is positioned below both the microwave source horizontal run and the production horizontal run, and the microwaves source run is positioned between the in injection horizontal run and the production horizontal run.

2. The method of treatment of claim 1 further comprising the steps of introducing an electrical submersible pump into the horizontal production well such that the ESP is located in a non-horizontal portion of the horizontal production well and operating the electrical submersible pump such that production fluid is extracted from the hydrocarbon-bearing formation.

3. The method of treatment of claim 1 where the miscible solvent of the heavy hydrocarbons is selected from the group consisting of air, nitrogen, oxygen, carbon monoxide, carbon dioxide, methane, ethane, propane, normal butane, liquidified petroleum gas (LPG) and combinations thereof.

4. The method of treatment of claim 1 where the introduction of electrical power is such that water present in the microwave energy field is converted into steam.

5. The method of treatment of claim 1 where the introduction of electrical power is such that the miscible solvent of the heavy hydrocarbon present in the microwave energy field is converted into a supercritical fluid.

6. The method of treatment of claim 1 where the introduction of electrical power is such that stress fracturing occurs in at least a portion of the hydrocarbon-bearing formation enveloped by the microwave energy field.

7. The method of treatment of claim 1 where the introduction of electrical power is such that light hydrocarbons form from the heavy hydrocarbons with reduced viscosity in the microwave energy field and such that the production fluid also comprises light hydrocarbons.

8. The method of treatment of claim 1 where the microwave emitter directs microwave energy towards the injection horizontal run and where the introduction of electrical power is such that the microwave energy field formed envelopes at least a portion of the injection horizontal run.

9. The method of treatment of claim 1 where the microwave emitter directs microwave energy towards the production horizontal run and where the introduction of electrical power is such that the microwave energy field formed envelopes at least a portion of the production horizontal run.

10. A microwave enhanced heavy hydrocarbon recovery system for recovering heavy hydrocarbons from a hydrocarbon-bearing formation of a crude oil reservoir, the microwave enhanced heavy oil recovery system comprising:
   a horizontal injection well that is defined by a horizontal injection well bore wall that extends from a surface to below a lower boundary of the crude oil reservoir, that is operable to permit fluid communication between the surface and the crude oil reservoir, and that is operable to permit the introduction of a treatment fluid into the crude oil reservoir, where a portion of the horizontal injection well is an injection horizontal run that has a casing along the horizontal injection well bore wall, and where the casing along the horizontal injection well bore wall is operable to permit fluid communication between the horizontal injection well and the crude oil reservoir;
   a horizontal microwave source well that is defined by a horizontal source well bore wall that extends from the surface to the lower boundary of the hydrocarbon-bearing formation, that is operable to permit communication between the surface and the hydrocarbon-bearing formation, and that is operable to permit the introduction of microwave energy into the crude oil reservoir, where a portion of the horizontal microwave source well is a microwave source horizontal run that has a casing along the horizontal source well bore wall that extends proximate to the lower boundary, and where the casing along the horizontal source well bore wall is operable to permit energy communication between the horizontal microwave source well and the crude oil reservoir;
   a horizontal production well that is defined by a horizontal production well bore wall that extends from the surface into the hydrocarbon-bearing formation, that is operable to permit fluid communication between the surface and the hydrocarbon-bearing formation, and that is operable to permit the extraction of a production fluid from the hydrocarbon-bearing formation, where a portion of the horizontal production well is a production horizontal run that has a casing along the horizontal production well bore wall, and where the casing along the horizontal production well bore wall is operable to permit fluid communication between the horizontal production well and the hydrocarbon-bearing formation; and
   a microwave energy field system that couples to a source of electrical power and has a microwave antenna with a microwave emitter, where the microwave antenna is operable to convey electrical power to the microwave emitter and is positioned in the horizontal microwave source well such that the microwave emitter is located in the microwave source horizontal run, and where the microwave emitter is operable to convert electrical power into microwave energy and to transmit the microwave energy directionally, and wherein the horizontal microwave source well is a separate from the horizontal injection well and the horizontal production well;
   where the injection horizontal run is positioned below both the microwave source horizontal run and the production horizontal run, and the microwave source horizontal run is positioned below the production horizontal run.

11. The system of claim 10 where the crude oil reservoir has an underburden stratum, where the underburden stratum is in fluid communication with and positioned below the hydrocarbon-bearing formation, and where the injection horizontal run is located in the underburden stratum.

12. The system of claim 10 where at least two of the group consisting of the injection horizontal run, the microwave source horizontal run, and the production horizontal run are in directional alignment with one another.

13. The system of claim 10 where at least two of the group consisting of the injection horizontal run, the microwave source horizontal run, and the production horizontal run are in both directional alignment and vertical alignment with one another.

14. The system of claim 10 where the microwave source horizontal run and the production horizontal run are located proximate to one another in the hydrocarbon-bearing formation such that a microwave energy field at least partially envelopes the production horizontal run.

15. The system of claim 10 where the microwave source horizontal run and the injection horizontal run are located proximate to one another in the crude oil reservoir such that a microwave energy field at least partially envelopes the injection horizontal run.

16. The system of claim 10 where the material of construction of the microwave source horizontal run casing is a non-perforated polymer.

17. The system of claim 16 where the non-perforated polymer is a polyvinyl chloride or a high-density polyethylene.

* * * * *

UNITED STATES PATENT AND TRADEMARK OFFICE
CERTIFICATE OF CORRECTION

PATENT NO.        : 9,341,050 B2
APPLICATION NO.   : 13/950852
DATED             : May 17, 2016
INVENTOR(S)       : Khaled A. Al-Buraik It is certified that error appears in the above-identified patent and that said Letters Patent is hereby corrected as shown below:

IN THE CLAIMS

Col. 18 line 54 the claim language "positioned below both the microwave source horizontal run and the production horizontal run, and the microwaves source run is positioned between the in injection horizontal run"

should read - "positioned below both the microwave source horizontal run and the production horizontal run, and the microwaves source run is positioned between the injection horizontal run"

Signed and Sealed this
Second Day of August, 2016

Michelle K. Lee
*Director of the United States Patent and Trademark Office*